United States Patent
Day et al.

(10) Patent No.: US 7,987,464 B2
(45) Date of Patent: Jul. 26, 2011

(54) LOGICAL PARTITIONING AND VIRTUALIZATION IN A HETEROGENEOUS ARCHITECTURE

(75) Inventors: Michael N. Day, Round Rock, TX (US); Michael Karl Gschwind, Chappaqua, NY (US); Mark R. Nutter, Austin, TX (US); James Xenidis, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 1398 days.

(21) Appl. No.: 11/459,669

(22) Filed: Jul. 25, 2006

(65) Prior Publication Data

US 2008/0028408 A1 Jan. 31, 2008

(51) Int. Cl.
*G06F 9/46* (2006.01)
*G06F 13/24* (2006.01)
*G06F 13/26* (2006.01)

(52) U.S. Cl. ........ 718/104; 718/102; 718/108; 710/260; 710/261; 710/266; 710/268

(58) Field of Classification Search ........................ None
See application file for complete search history.

(56) References Cited

U.S. PATENT DOCUMENTS

| | | | | |
|---|---|---|---|---|
| 5,345,590 A * | 9/1994 | Ault et al. | ........................ | 718/1 |
| 5,361,375 A * | 11/1994 | Ogi | ........................ | 718/1 |
| 5,506,975 A * | 4/1996 | Onodera | ........................ | 718/1 |
| 6,260,068 B1 * | 7/2001 | Zalewski et al. | ........................ | 709/226 |
| 6,542,926 B2 * | 4/2003 | Zalewski et al. | ........................ | 709/213 |
| 6,587,938 B1 * | 7/2003 | Eilert et al. | ........................ | 712/29 |
| 6,625,638 B1 * | 9/2003 | Kubala et al. | ........................ | 718/105 |
| 6,633,916 B2 * | 10/2003 | Kauffman | ........................ | 709/229 |
| 6,912,493 B1 * | 6/2005 | Scheel et al. | ........................ | 703/2 |
| 6,957,435 B2 * | 10/2005 | Armstrong et al. | ........................ | 718/104 |
| 7,000,051 B2 * | 2/2006 | Armstrong et al. | ........................ | 710/267 |
| 7,039,836 B2 * | 5/2006 | Powers et al. | ........................ | 714/48 |
| 7,103,639 B2 * | 9/2006 | Walton et al. | ........................ | 709/215 |
| 7,213,248 B2 * | 5/2007 | Arimilli et al. | ........................ | 718/104 |
| 7,222,203 B2 * | 5/2007 | Madukkarumukumana et al. | ........................ | 710/260 |
| 7,281,075 B2 * | 10/2007 | Armstrong et al. | ........................ | 710/267 |
| 7,441,066 B2 * | 10/2008 | Bouchier et al. | ........................ | 710/312 |
| 7,448,037 B2 * | 11/2008 | Arimilli et al. | ........................ | 718/104 |
| 7,500,039 B2 * | 3/2009 | Day et al. | ........................ | 710/262 |
| 7,836,450 B2 * | 11/2010 | Kissell | ........................ | 718/100 |
| 2002/0124040 A1 * | 9/2002 | Foster et al. | ........................ | 709/100 |
| 2002/0135582 A1 * | 9/2002 | Suzuoki et al. | ........................ | 345/502 |
| 2002/0184328 A1 | 12/2002 | Richardson et al. | | |
| 2003/0037092 A1 * | 2/2003 | McCarthy et al. | ........................ | 709/104 |
| 2004/0111596 A1 | 6/2004 | Rawson, III | | |
| 2004/0117532 A1 * | 6/2004 | Bennett et al. | ........................ | 710/260 |

(Continued)

OTHER PUBLICATIONS

Jann et al., "Dynamic reconfiguration: Basic building blocks for autonomic computing on IBM pSeries servers", IBM Systems Journal, vol. 42, No. 1, 2003, pp. 29-37.

*Primary Examiner* — Meng A An
*Assistant Examiner* — Abdullah Al Kawsar
(74) *Attorney, Agent, or Firm* — Yee & Associates, P.C.; Matthew B. Talpis (57) ABSTRACT

A method, apparatus, and computer usable program code for logical partitioning and virtualization in heterogeneous computer architecture. In one illustrative embodiment, a portion of a first set of processors of a first type is allocated to a partition in a heterogeneous logically partitioned system and a portion of a second set of processors of a second type is allocated to the partition.

26 Claims, 6 Drawing Sheets

U.S. PATENT DOCUMENTS

| | | |
|---|---|---|
| 2004/0139437 A1 | 7/2004 | Arndt |
| 2004/0199632 A1* | 10/2004 | Romero et al. ............... 709/226 |
| 2004/0205272 A1* | 10/2004 | Armstrong et al. ........... 710/260 |
| 2004/0221193 A1* | 11/2004 | Armstrong et al. ............. 714/10 |
| 2005/0021913 A1* | 1/2005 | Heller ........................... 711/141 |
| 2005/0081181 A1* | 4/2005 | Brokenshire et al. ......... 717/100 |
| 2005/0081201 A1* | 4/2005 | Aguilar et al. ................ 718/100 |
| 2005/0166074 A1* | 7/2005 | Hack .............................. 713/320 |
| 2005/0216720 A1* | 9/2005 | Michaelis et al. ................ 713/2 |
| 2005/0240925 A1* | 10/2005 | Ault et al. ..................... 718/100 |
| 2005/0278722 A1* | 12/2005 | Armstrong et al. ........... 718/104 |
| 2007/0256076 A1* | 11/2007 | Thompson et al. ........... 718/102 |
| 2007/0294689 A1* | 12/2007 | Garney ............................. 718/1 |
| 2008/0022278 A1* | 1/2008 | Gschwind et al. ............ 718/100 |

* cited by examiner

LOGICAL PARTITIONING AND VIRTUALIZATION IN A HETEROGENEOUS ARCHITECTURE

BACKGROUND

1. Field of the Invention

The present application generally relates to an improved data processing system and in particular to a method and apparatus for managing a data processing system. Still more particularly, the present invention relates to a computer implemented method, apparatus, and computer usable program code for logical partitioning and virtualization in a data processing system.

2. Description of the Related Art

In modern processor architectures, management of computer systems is a significant part of the total cost of ownership. A preferred solution to this challenge has been the use of hypervisors. A hypervisor is a scheme for allowing multiple operating systems to run on a computer system at the same time. A hypervisor may be implemented as a software layer that divides a system into multiple logical partitions that are able to execute independent operating systems. Because of these attractive attributes, including high security by separating independent workloads, ease of management, and so forth, the use of hypervisors has been an attractive solution for server system consolidation.

Currently, logical partitioning (LPAR) has been used to divide a single system into multiple partitions, a partition consisting of a subset of a set of similar processors. LPAR is a system architecture approach that promises to revolutionize corporate information technology (IT) infrastructures by enabling the capability to virtualize hardware resources that can be shared by multiple independent operating environments. Dynamic LPAR is an LPAR in which the resources of a system may be dynamically redefined during operation of the system. Virtualization of a system means that the system has the ability to simulate the availability of hardware that may not be present in sufficient amount or at all. Virtualization uses the available physical resources as a shared pool to emulate missing physical resources. Originally developed for mainframe computers, LPAR allows the division of a single server into several completely independent virtual servers or logical partitions. LPAR on eServer™ i5 is supported by i5/OS™ and AIX® 5L™, which are operating systems available from International Business Machines Corporation (IBM), and by the Linux™ operating system available from one or more Linux distributors.

Since its introduction, LPAR used on the iSeries™ and now eServer™ i5 has re-energized server consolidation and information technology cost optimization strategies. Today, many IT users have successfully deployed LPAR to achieve quick consolidation of multiple workload environments, time zones, and footprints within a single or fewer iSeries™ or eServer™ i5 systems. These users have taken advantage of LPAR to benefit from the growing industry trend and the desire to optimize information technology investments and resource virtualization through consolidation of hardware, software, networks, data centers, and, more importantly, skills.

The innovations on virtualization of hardware resources continues to benefit both iSeries™ and pSeries™ clients. Introduced first on the eServer™ i5, the IBM Virtualization Engine system extends innovations such as Micro-Partitioning™ to AIX® 5L™, automatic processor balancing with uncapped processor partitioning, and further exploiting virtual input/output (I/O) capabilities. A description of a state of the art dynamic logical partitioning system can be found in Jann et al, Dynamic Reconfiguration: Basic Building Blocks for Autonomic Computing on IBM pSeries Servers, IBM SYSTEMS JOURNAL, VOL 42, NO 1, 2003.

SUMMARY

The exemplary embodiments described herein recognize the disadvantages of the prior art and provide a method, apparatus, and computer usable program code for logical partitioning and virtualization in heterogeneous computer architecture. In one illustrative embodiment, a portion of a first set of processors of a first type is allocated to a partition in a logically partitioned heterogeneous processor system and a portion of a second set of processors of a second type is allocated to the partition.

In another illustrative embodiment, the first set of processors comprises a single processor of the first type. In allocating a portion of the first set of processors of the first type to a partition, a time-shared portion of the single processor of the first type is allocated to the partition.

An operating system may be booted in the partition. Boot parameters may be read to determine if a number of processors available in the second set of processors. Responsive to a reconfiguration event, a portion of the first set of processors may be reallocated to the partition and a portion of the second set of processors may be reallocated to the partition. Responsive to a request to allocate a processor of the second type from the operating system, an additional processor of the second type may be allocated to the partition.

The heterogeneous architecture may be a Cell Broadband Engine (BE) architecture. The first set of processors may take the form of a set of Power Processor Elements (PPE) and the second set of processors is a set of Synergistic Processor Elements (SPE).

In one exemplary embodiment, a logical partition identifier may be assigned to a given SPE to associate with a partition and writing the assigned logical partition identifier to at least one configuration register associated with the given SPE. In another exemplary embodiment, an exception may be routed to a PPE in an internal interrupt controller based on the logical partition identifier.

In a further illustrative embodiment, the partition is a first partition and a second portion of the first set of processors of the first type is allocated to a second partition and a second portion of the second set of processors of the second type is allocated to the second partition. In an exemplary embodiment, the first partition is an application partition or a gaming partition. In another exemplary embodiment, the second partition is a network partition, a security partition or a media recording partition.

A data processing system may include a first set of processors of a first type, a second set of processors of a second type, and partition management software. The partition management software allocates a portion of the first set of processors to a partition in a heterogeneous logically partitioned system and allocates a portion of the second set of processors to the partition.

In other exemplary embodiments, the data processing system performs various ones of the operations outlined above with regard to the method in the illustrative embodiments.

In another illustrative embodiment, a computer program product for logical partitioning and virtualization in a heterogeneous computer architecture comprises a computer usable medium having computer usable program code embodied therein. The computer usable program code is configured to allocate a portion of a first set of processors of a first type to a partition in a heterogeneous logically partitioned system, and to allocate a portion of a second set of processors of a second type to the partition.

In other exemplary embodiments, the computer program product comprises computer usable program code for performing various ones of the operations outlined above with regard to the method in the illustrative embodiments.

BRIEF DESCRIPTION OF THE DRAWINGS

The novel features believed characteristic of the invention are set forth in the appended claims. The exemplary embodiments, however, as well as a preferred mode of use, further objectives and advantages thereof, will best be understood by reference to the following detailed description when read in conjunction with the accompanying drawings, wherein:

DETAILED DESCRIPTION OF THE PREFERRED EMBODIMENT

Figure 1:
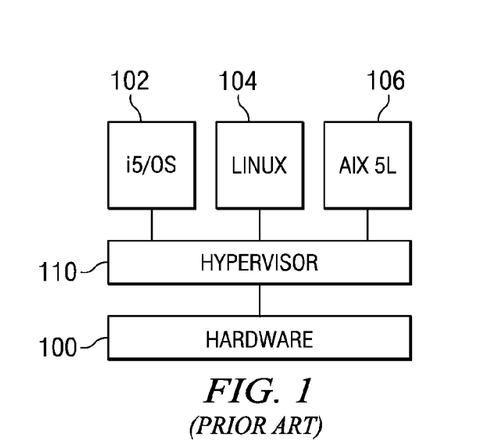
FIG. 1 illustrates a prior art system including a hypervisor and capable of supporting multiple operating systems in accordance with an illustrative embodiment.

With reference now to the drawings, FIG. 1 illustrates a prior art computer system including a hypervisor and is capable of supporting multiple operating systems. The computer system includes hardware 100. In these illustrative embodiments, hardware 100 contains components found in computer systems. In these examples, the processor architecture of hardware 100 is implemented using Power Archtecture™ from IBM.

Hardware 100 is partitioned to run operating systems 102, 104, and 106. In the depicted example, operating system 102 is an i5/OS™ operating system, operating system 104 is a Linux™ operating system, and operating system 106 is an AIX® 5L™ operating system. In various other implementations, operating systems 102, 104, and 106 may be multiple copies of a single operating system or multiple heterogeneous operating systems running simultaneously on hardware 100.

The operating systems are designed to interface with a partition management software, such as hypervisor 110. Of course, other types of operating systems may be used depending on the particular implementation. Hypervisor software is an example of partition management software that may be used to implement partition management software and is available from International Business Machines Corporation. In this example, hypervisor 110 is in the form of firmware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Hardware 100 may include, for example, a processor, a system memory unit, an input/output (I/O) adapter, and one or more storage units. Hypervisor 110 may assign each of the processors, memory units, storage units, and I/O adapters to one of the multiple partitions. Each of these partitions corresponds to one of operating systems 102, 104, and 106.

Innovations in the server arena have not included support for lower-end systems. Desktop computer systems are typically only able to run a single operating system, or emulate one operating system under a second operating system, such as provided by VirtualPC™ or VMware™ applications emulating a first operating system on a second operating system. Emulating a first operating system on a second operating system has undesirable aspects relating to performance, system stability, and maintenance.

Currently Available Heterogeneous Processor systems used in computer systems have been characterized by a collection of fixed function accelerators and special purpose processing units, but do not implement a common architecture. With such processor systems, usually a single operating system manages the main processor, while accelerators and special purpose processing units typically are allocated to fixed acceleration tasks, such as global system mobile (GSM) communications speech encode and decode, or protocol and signal processing. Currently available heterogeneous processor systems have been limited to running a single operating system.

Figure 2:
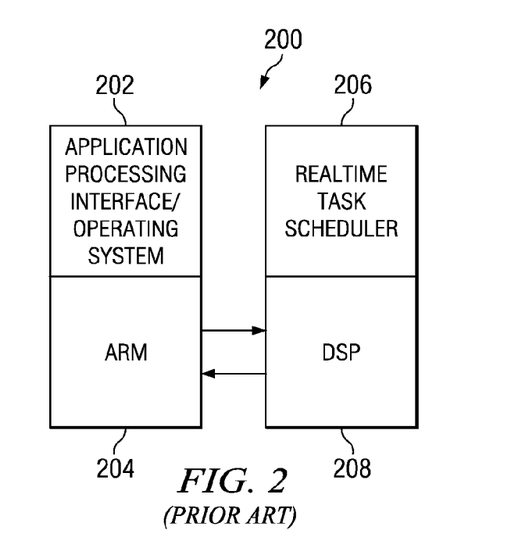
FIG. 2 is a block diagram illustrating an example of an advanced prior art heterogeneous processor system in accordance with an illustrative embodiment.

FIG. 2 is a block diagram illustrating an example of an advanced prior art heterogeneous processor system. A heterogeneous processor system is a plurality of processors in which at least two types of processors are present. These processors may be on different chips, or some or all of the processors may be located on the same chip.

In this example, the heterogeneous processor system includes a general purpose processor and a second special purpose processor. As discussed, the general purpose processor is Advanced RISC (ARM) processor 204, the special purpose processor is digital signal processor (DSP) 208. ARM is a family of RISC-based microprocessors and microcontrollers from ARM Inc.

ARM processor 204 runs application-oriented operating system 202, and DSP 208 runs real-time task scheduler 206. In this example, the known processor system shown in FIG. 2 provides the ability to run independent operating systems on a collection of processors, but not multiple operating systems wherein each operating system manages both processors of a first and a second type. This solution, however, does not offer integrated management of applications, a consistent system view with a common memory hierarchy or optimized scheduling of applications across a heterogeneous processor system.

The illustrative embodiments recognize that the design of integrated management, virtualization, and logical partitioning of heterogeneous multi-core processors while providing an integrated system view has thus far eluded those skilled in the art. The depicted embodiments recognize a need to provide virtualization and logical partitioning in a computer system having a heterogeneous multi-core processor. What is furthermore desirable is to provide a consistent view of the computer system with dynamic management capabilities, while offering an integrated system view encompassing all processing elements in a computer system. The embodiments also recognize that it is desirable to have the ability to partition a multi-core processor consisting of a first and second processor element type into multiple subsystems, each of which having optionally both element types within their respective partitions. A processor core is a processing unit on a chip. A processor core typically includes an instruction unit and an execution unit. A processor core also may include other components, such as a cache. Multiple processor cores may be placed on a chip to form a multi-core processor.

In another embodiment, a hypervisor offering these features is adapted to execute on a processor architecture consisting of a first type of processor elements optimized for general-purpose processing, and a second type of processor elements optimized for data-processing. In another embodiment, the hypervisor understands the heterogeneous nature of a heterogeneous processor system in which only a first type of processor elements can perform certain tasks. With this type of environment, the hypervisor schedules at least one processor of the first type in response to a request to perform such task in response to actions by a second type of processor. An example of such a task is servicing a page fault.

In an "always-on" small office/home office environment, or in private homes, hypervisors may offer attractive properties, such as securely separating applications from other functions like network functions related to data and application download, digital personal video recorder, and digital media downloads. In another example of hypervisor functions, a first partition can execute an application assuming full control of a partition, while in another partition, network services and the like may be operating with a specific local network service requirements. The second partition may, for example, execute software or drivers to act as a bridge between a fully controlling system, such as the first partition, not having awareness of different network topologies and the local network.

Figure 3:
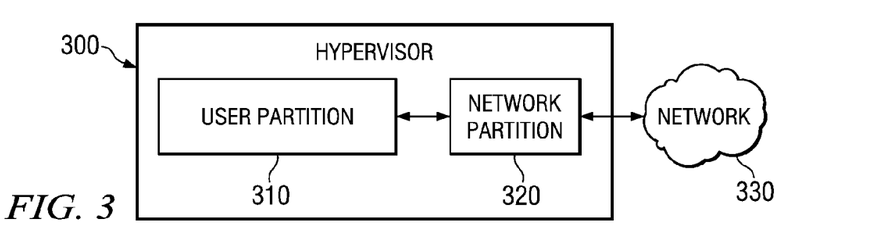
FIG. 3 is a block diagram illustrating the use of a hypervisor system in a user application environment in accordance with an illustrative embodiment.

FIG. 3 is a block diagram illustrating the use of a hypervisor in a user application environment in accordance with an illustrative embodiment. A computer system runs under the control of hypervisor 300 and has at least two partitions. In the depicted example, one partition is user partition 310 and is directed at a user operating system or other user applications. These applications include, but are not limited to, a desktop operating system, a video display system, and a game application.

In one embodiment, user partition 310 is fixed, and not aware of specific configuration, I/O, and network characteristics. These other services are provided by at least one other partition.

For example, network partition 320, is directed to providing at least one service to user partition 310. In one embodiment, network partition 320 provides network services via network 330 and is aware of specific network access medium and topology requirements. In an exemplary embodiment, this service may be provided by network partition 320 running a Linux™ operating system. In another embodiment, network partition 320 may execute an operating system provided by a network service provider.

Additional partitions may be provided, such as those directed to other services. Recording a video stream to a storage medium, in which the video stream optionally being received from a broadband network or a broadcast channel, is an example of a service.

Figure 4:
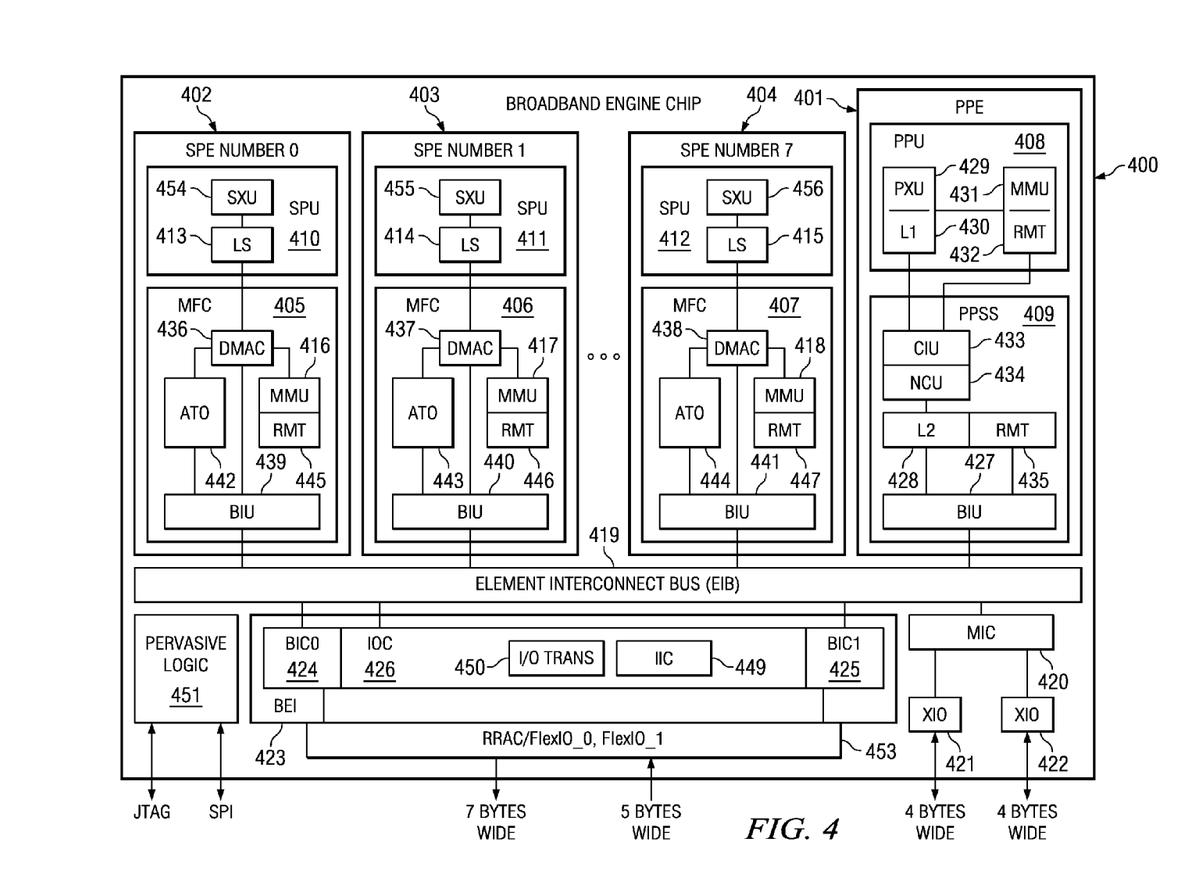
FIG. 4 depicts an exemplary diagram of a Cell BE chip in which aspects of the illustrative embodiments may be implemented.

Referring now to FIG. 4, a block diagram is shown illustrating an exemplary Cell Broadband Engine (BE) chip in accordance with the exemplary embodiment. FIG. 4 is provided as an exemplary diagram of a data processing environment in which aspects of the exemplary embodiments may be implemented. It should be appreciated that FIG. 4 is only exemplary and is not intended to assert or imply any limitation with regard to the environments in which different embodiments may be implemented. Many modifications to the depicted environment may be made without departing from the spirit and scope of the illustrative embodiments.

Cell BE chip 400 is an example of a heterogeneous processor system using a single-chip multi-core processor. This illustrative embodiment is directed toward distributed processing targeted for media-rich applications such as game consoles, desktop systems, and servers.

Cell BE chip 400 may be logically separated into the following functional components: Power PC® processor element (PPE) 401, synergistic processor units (SPEs) 402, 403, and 404, and memory flow controllers (MFCs) 405, 406, and 407. Although synergistic processor elements (SPEs) 402, 403, and 404 and PPE 401 are shown by example, any type of processor element may be supported. Exemplary Cell BE chip 400 implementation includes one PPE 401 and eight SPEs, although FIG. 4 shows only three SPEs 402, 403, and 404. The SPE of a CELL Processor is a first implementation of a new processor architecture designed to accelerate media and data streaming workloads.

Cell BE chip 400 may be a system-on-a-chip such that each of the elements depicted in FIG. 4 may be provided on a single microprocessor chip. Moreover, Cell BE chip 400 is a heterogeneous processing environment in which each of SPUs 410, 411, and 412 may receive different instructions from each of the other SPUs in the system. Moreover, the instruction set for SPUs 410, 411, and 412 is different from that of Power PC® processor unit (PPU) 408, e.g., PPU 408 may execute Reduced Instruction Set Computer (RISC) based instructions in the Power™ architecture while SPUs 410, 411, and 412 execute vectorized instructions.

Each SPE includes one SPU 410, 411, or 412 with its own local store (LS) area 413, 414, or 415 and a dedicated MFC 405, 406, or 407 that has an associated memory management unit (MMU) 416, 417, or 418 to hold and process memory protection and access permission information. Once again, although SPUs are shown by example, any type of processor unit may be supported. Additionally, Cell BE chip 400 implements element interconnect bus (EIB) 419 and other I/O structures to facilitate on-chip and external data flow.

EIB 419 serves as the primary on-chip bus for PPE 401 and SPEs 402, 403, and 404. In addition, EIB 419 interfaces to other on-chip interface controllers that are dedicated to off-chip accesses. The on-chip interface controllers include the memory interface controller (MIC) 420, which provides two extreme data rate I/O (XIO) memory channels 421 and 422, and Cell BE interface unit (BEI) 423, which provides two high-speed external I/O channels and the internal interrupt control for Cell BE 400. BEI 423 is implemented as bus interface controllers (BICs, labeled BIC0 & BIC1) 424 and 425 and I/O interface controller (IOC) 426. The two high-speed external I/O channels connected to a polarity of Redwood Rambus® Asic Cell (RRAC) interfaces providing the flexible input and output (FlexIO_0 & FlexIO_1) 453 for the Cell BE 400.

Each SPU 410, 411, or 412 has a corresponding LS area 413, 414, or 415 and synergistic execution units (SXU) 454, 455, or 456. Each individual SPU 410, 411, or 412 can execute instructions (including data load and store operations) only from within its associated LS area 413, 414, or 415. For this reason, MFC direct memory access (DMA) operations via SPU's 410, 411, and 412 dedicated MFCs 405, 406, and 407 perform all required data transfers to or from storage elsewhere in a system.

A program running on SPU 410, 411, or 412 only references its own LS area 413, 414, or 415 using a LS address. However, each SPU's LS area 413, 414, or 415 is also assigned a real address (RA) within the overall system's memory map. The RA is the address for which a device will respond. In the Power PC®, an application refers to a memory location (or device) by an effective address (EA), which is then mapped into a virtual address (VA) for the memory location (or device) which is then mapped into the RA. The EA is the address used by an application to reference memory and/or a device. This mapping allows an operating system to allocate more memory than is physically in the system (i.e. the term virtual memory referenced by a VA). A memory map is a listing of all the devices (including memory) in the system and their corresponding RA. The memory map is a map of the real address space which identifies the RA for which a device or memory will respond.

This allows privileged software to map a LS area to the EA of a process to facilitate direct memory access transfers between the LS of one SPU and the LS area of another SPU. PPE 401 may also directly access any SPU's LS area using an EA. In the Power PC® there are three states (problem, privileged, and hypervisor). Privileged software is software that is running in either the privileged or hypervisor states. These states have different access privileges. For example, privileged software may have access to the data structures register for mapping real memory into the EA of an application. Problem state is the state the processor is usually in when running an application and usually is prohibited from accessing system management resources (such as the data structures for mapping real memory).

The MFC DMA data commands always include one LS address and one EA. DMA commands copy memory from one location to another. In this case, an MFC DMA command copies data between an EA and a LS address. The LS address directly addresses LS area 413, 414, or 415 of associated SPU 410, 411, or 412 corresponding to the MFC command queues. Command queues are queues of MFC commands. There is one queue to hold commands from the SPU and one queue to hold commands from the PXU or other devices. However, the EA may be arranged or mapped to access any other memory storage area in the system, including LS areas 413, 414, and 415 of the other SPEs 402, 403, and 404.

Main storage (not shown) is shared by PPU 408, PPE 401, SPEs 402, 403, and 404, and I/O devices (not shown) in a system, such as the system shown in FIG. 2. All information held in main memory is visible to all processors and devices in the system. Programs reference main memory using an EA. Since the MFC proxy command queue, control, and status facilities have RAs and the RA is mapped using an EA, it is possible for a power processor element to initiate DMA operations, using an EA between the main storage and local storage of the associated SPEs 402, 403, and 404.

As an example, when a program running on SPU 410, 411, or 412 needs to access main memory, the SPU program generates and places a DMA command, having an appropriate EA and LS address, into its MFC 405, 406, or 407 command queue. After the command is placed into the queue by the SPU program, MFC 405, 406, or 407 executes the command and transfers the required data between the LS area and main memory. MFC 405, 406, or 407 provides a second proxy command queue for commands generated by other devices, such as PPE 401. The MFC proxy command queue is typically used to store a program in local storage prior to starting the SPU. MFC proxy commands can also be used for context store operations.

The EA address provides the MFC with an address which can be translated into a RA by the MMU. The translation process allows for virtualization of system memory and access protection of memory and devices in the real address space. Since LS areas are mapped into the real address space, the EA can also address all the SPU LS areas.

PPE 401 on Cell BE chip 400 consists of 64-bit PPU 408 and Power PC® storage subsystem (PPSS) 409. PPU 408 contains processor execution unit (PXU) 429, level 1 (L1) cache 430, MMU 431 and replacement management table (RMT) 432. PPSS 409 consists of cacheable interface unit (CIU) 433, non-cacheable unit (NCU) 434, level 2 (L2) cache 428, RMT 435 and bus interface unit (BIU) 427. BIU 427 connects PPSS 409 to EIB 419.

SPU 410, 411, or 412 and MFCs 405, 406, and 407 communicate with each other through unidireactional channels that have capacity. Channels are essentially a FIFO which are accessed using one of 34 SPU instructions; read channel (RDCH), write channel (WRCH), and read channel count (RDCHCNT). The RDCHCNT returns the amount of information in the channel. The capacity is the depth of the FIFO. The channels transport data to and from MFCs 405, 406, and 407, SPUs 410, 411, and 412. BIUs 439, 440, and 441 connect MFCs 405, 406, and 407 to EIB 419.

MFCs 405, 406, and 407 provide two main functions for SPUs 410, 411, and 412. MFCs 405, 406, and 407 move data between SPUs 410, 411, or 412, LS area 413, 414, or 415, and main memory. Additionally, MFCs 405, 406, and 407 provide synchronization facilities between SPUs 410, 411 and 412 and other devices in the system.

MFCs 405, 406, and 407 implementation has four functional units: direct memory access controllers (DMACs) 436, 437, and 438, MMUs 416, 417, and 418, atomic units (ATOs) 442, 443, and 444, RMTs 445, 446, and 447, and BIUs 439, 440, and 441. DMACs 436, 437, and 438 maintain and process MFC command queues (MFC CMDQs) (not shown), which consist of a MFC SPU command queue (MFC SPUQ) and a MFC proxy command queue (MFC PrxyQ). The sixteen-entry, MFC SPUQ handles MFC commands received from the SPU channel interface. The eight-entry, MFC PrxyQ processes MFC commands coming from other devices, such as PPE 401 or SPEs 402, 403, and 404, through memory mapped input and output (MMIO) load and store operations. A typical direct memory access command moves data between LS area 413, 414, or 415 and the main memory. The EA parameter of the MFC DMA command is used to address the main storage, including main memory, local storage, and all devices having a RA. The local storage parameter of the MFC DMA command is used to address the associated local storage.

In a virtual mode, MMUs 416, 417, and 418 provide the address translation and memory protection facilities to handle the EA translation request from DMACs 436, 437, and 438 and send back the translated address. Each SPE's MMU maintains a segment lookaside buffer (SLB) and a translation lookaside buffer (TLB). The SLB translates an EA to a VA and the TLB translates the VA coming out of the SLB to a RA. The EA is used by an application and is usually a 32- or 64-bit address. Different application or multiple copies of an application may use the same EA to reference different storage locations (for example, two copies of an application each using the same EA, will need two different physical memory locations.) To accomplish this, the EA is first translated into a much larger VA space which is common for all applications running under the operating system. The EA to VA translation is performed by the SLB. The VA is then translated into a RA using the TLB, which is a cache of the page table or the mapping table containing the VA to RA mappings. This table is maintained by the operating system.

ATOs 442, 443, and 444 provide the level of data caching necessary for maintaining synchronization with other processing units in the system. Atomic direct memory access commands provide the means for the synergist processor elements to perform synchronization with other units.

The main function of BIUs 439, 440, and 441 is to provide SPEs 402, 403, and 404 with an interface to the EIB. EIB 419 provides a communication path between all of the processor cores on Cell BE chip 400 and the external interface controllers attached to EIB 419.

MIC 420 provides an interface between EIB 419 and one or two of XIOs 421 and 422. Extreme data rate (XDR™) dynamic random access memory (DRAM) is a high-speed, highly serial memory provided by Rambus®. A macro provided by Rambus accesses the extreme data rate dynamic random access memory, referred to in this document as XIOs 421 and 422.

MIC 420 is only a slave on EIB 419. MIC 420 acknowledges commands in its configured address range(s), corresponding to the memory in the supported hubs.

BICs 424 and 425 manage data transfer on and off the chip from EIB 419 to either of two external devices. BICs 424 and 425 may exchange non-coherent traffic with an I/O device, or it can extend EIB 419 to another device, which could even be another Cell BE chip. When used to extend EIB 419, the bus protocol maintains coherency between caches in the Cell BE chip 400 and the caches in the attached external device, which could be another Cell BE chip.

IOC 426 handles commands that originate in an I/O interface device and that are destined for the coherent EIB 419. An I/O interface device may be any device that attaches to an I/O interface such as an I/O bridge chip that attaches multiple I/O devices or another Cell BE chip 400 that is accessed in a non-coherent manner. IOC 426 also intercepts accesses on EIB 419 that are destined to memory-mapped registers that reside in or behind an I/O bridge chip or non-coherent Cell BE chip 400, and routes them to the proper I/O interface. IOC 426 also includes internal interrupt controller (IIC) 449 and I/O address translation unit (I/O Trans) 450.

Pervasive logic 451 is a controller that provides the clock management, test features, and power-on sequence for the Cell BE chip 400. Pervasive logic may provide the thermal management system for the processor. Pervasive logic contains a connection to other devices in the system through a Joint Test Action Group (JTAG) or Serial Peripheral Interface (SPI) interface, which are commonly known in the art.

Although specific examples of how the different components may be implemented have been provided, this is not meant to limit the architecture in which the aspects of the illustrative embodiments may be used. The aspects of the illustrative embodiments may be used with any multi-core processor system.

Figure 5:
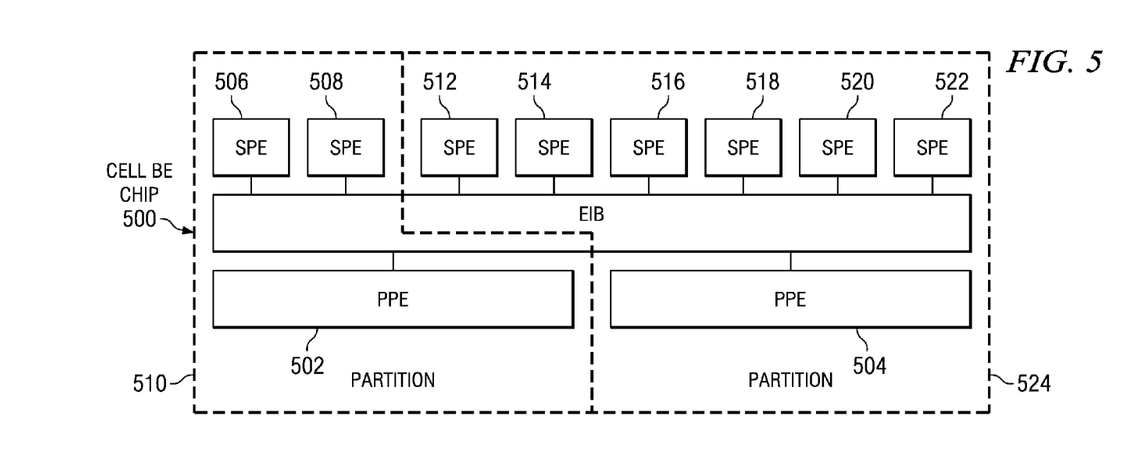
FIG. 5 illustrates an example of partitioning a heterogeneous processor system in accordance with an illustrative embodiment.

FIG. 5 illustrates an example of partitioning a heterogeneous processor system in accordance with an illustrative embodiment. In the depicted example, Cell BE chip 500 is an example of a heterogeneous processor system. The hypervisor (not shown) may be software running on PPE 502 and 504, for example. In Cell BE chip 500, PPE 502 and a first set of SPEs, SPEs 506 and 508, are allocated to a first partition, partition 510. PPE 504 and a second set of SPEs, SPEs 512-522, are allocated to a second partition, partition 524.

Figure 6:
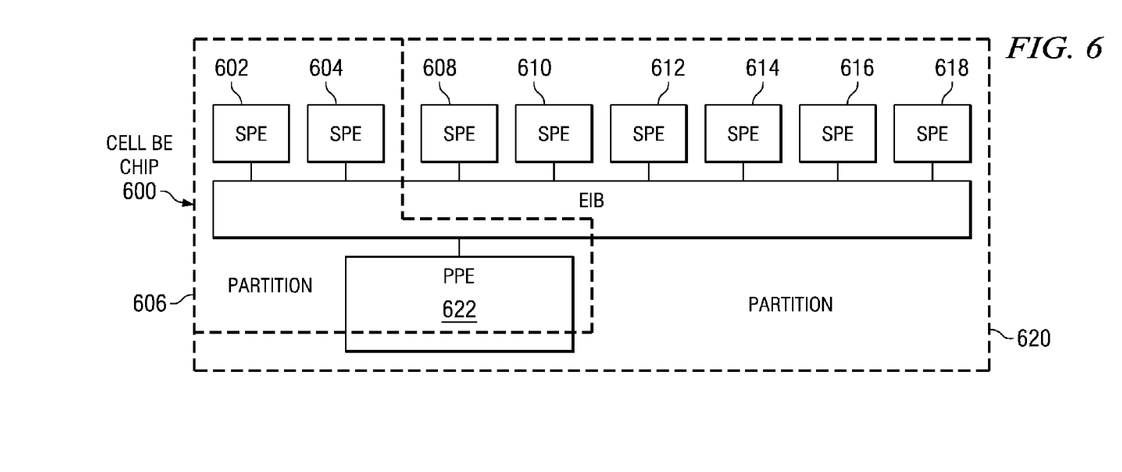
FIG. 6 illustrates partitioning of a heterogeneous processor system with time-sharing of a processor is depicted in accordance with an illustrative embodiment.

Referring to FIG. 6, partitioning of a heterogeneous processor system with time-sharing of a processor is depicted in accordance with an illustrative embodiment. In this example, Cell BE chip 600 is virtualized and shared between partitions. In the depicted example, a hypervisor (not shown) provides a fixed allocation of SPEs 602 and 604 to partition 606, and SPEs 608-618 to partition 620. The two partitions share a portion of PPE 622 in a time-shared fashion. Time-sharing occurs, in this example, because processing time or cycles for PPE 622 is shared between partition 606 and partition 620.

Those of ordinary skill in the art will understand that another partition consisting only of a PPE, or multiples, or fractions thereof are also possible as an example of another illustrative configuration. In some systems, partitions consisting wholly of a second set of computing elements are supported by the illustrative embodiments. Referring now to an embodiment based on the Cell BE chip, a fraction of a first PPE is used to ensure certain system services provided by the PPE, as discussed below with reference to FIG. 11.

In another embodiment, a partition consisting of a dedicated function executing exclusively on an SPE may be supported. In another embodiment, at least one SPE is assigned to the hypervisor to implement hypervisor support tasks and/or to emulate a virtual device provided by the hypervisor to at least one logical partition. Some examples of hypervisor support tasks include performing memory copy operations or managing virtualized I/O operations.

Depending on the implementation, a hypervisor may support different strategies for resource allocation and management with respect to a first set and second set of processor elements. For example, in an exemplary embodiment based on the Cell BE chip, a hypervisor design may use time-sharing for PPEs with an emphasis on flexibility given a comparatively lower context switch cost and a low number of PPEs being available. The hypervisor may implement space sharing for SPEs, with an emphasis on computing performance, and given a comparatively higher context switch cost and a high number of SPEs in system. Time-sharing is when a processor is virtualized by providing time slices to different virtual processors to provision multiple virtual processors. In the depicted example, the PPE is time-shared between partitions. Space sharing is where multiple processors are provisioned in hardware and they are allocated to different virtual processors in a specific partition, i.e., the resources are shared by allocating a set of resources to a specific virtual machine. In the depicted example, the SPEs are space shared.

Figure 7:
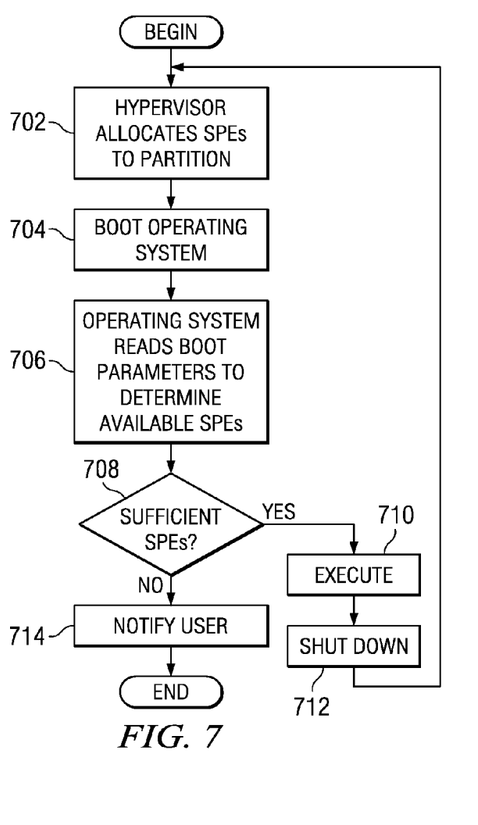
FIG. 7 is a flowchart of a process for the operation of a heterogeneous processor system with space sharing of SPEs, wherein reboot of a partition occurs when partition parameters changed, in accordance with an illustrative embodiment.

FIG. 7 is a flowchart of a process for the operation of a heterogeneous processor system with space sharing of SPEs, wherein reboot of a partition occurs when partition parameters changed, in accordance with an illustrative embodiment. It will be understood that each step of the flowchart illustrations, and combinations of steps in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart step or steps.

These computer program instructions may also be stored in a computer-readable memory, transmission medium, or storage medium that can direct a processor or other programmable data processing apparatus to function in a particular manner, such that the instructions stored in the computer-readable memory, transmission medium, or storage medium produce an article of manufacture including instruction means which implement the functions specified in the flowchart step or steps.

Accordingly, steps of the flowchart illustrations support combinations of means for performing the specified functions, combinations of steps for performing the specified functions and computer usable program code for performing the specified functions. It will also be understood that each step of the flowchart illustrations, and combinations of steps in the flowchart illustrations, can be implemented by special purpose hardware-based computer systems which perform the specified functions or steps, or by combinations of special purpose hardware and computer instructions.

With particular reference to FIG. 7, the hypervisor allocates SPEs to a partition (step 702). Then, the hypervisor boots an operating system for the partition (step 704). The operating system reads the boot parameters to determine available SPEs (step 706).

In allocating an SPE to a partition, the hypervisor allocates an SPE in one embodiment by programming at least one register to indicate the logical partition identifier (LPID) of the partition to which the SPE is allocated. The hypervisor assigns a logical partition identifier to a SPE to be associated with a partition and writes the assigned logical partition identifier to at least one configuration register associated with the given SPE. In the depicted example, the LPID is used to identify the target partition for exceptions generated by the SPE. In another example, the LPID in an SPE is used to locate and identify page table information associated with the partition.

Referring now to the allocation of SPEs, in one embodiment the hypervisor allocates, at least one SPE to itself. In another embodiment, the hypervisor uses the SPU to perform hypervisor acceleration tasks. In yet another embodiment, the hypervisor uses at least one SPE to perform acceleration tasks. The hypervisor also uses an SPE to provide a variety of security and digital rights management (DRM) functions in other embodiments.

The operating system determines whether sufficient SPEs are available (step 708). If sufficient SPEs are available, the operating system executes (step 710). In step 710, the operating system runs to perform operating system tasks and executes applications until the partition is shut down. A partition is a virtual computer, and "system executes" in this case means the virtual system is in operation until terminated. When execution in the partition as described in step 710 terminates, the partition shuts down (step 712) and the process returns to step 702 where the hypervisor allocates the SPEs to another partition. Turning back to step 708, if sufficient SPEs are not available, the operating system notifies the user (step 714) and the process ends. When the user is notified in step 714, the user may perform different actions. For example, the user may use another application, invoke the application and tell it to use fewer SPEs, or terminate another application and restart this application.

With respect to the creation of partitions, the hypervisor can support creation of partitions containing at least one PPE and one SPE, partitions containing only PPE processors, and partitions containing only SPE processors. In an illustrative embodiment, the hypervisor provides additional support functions to SPE-only partitions to provide at least basic system memory management functions.

Figure 8:
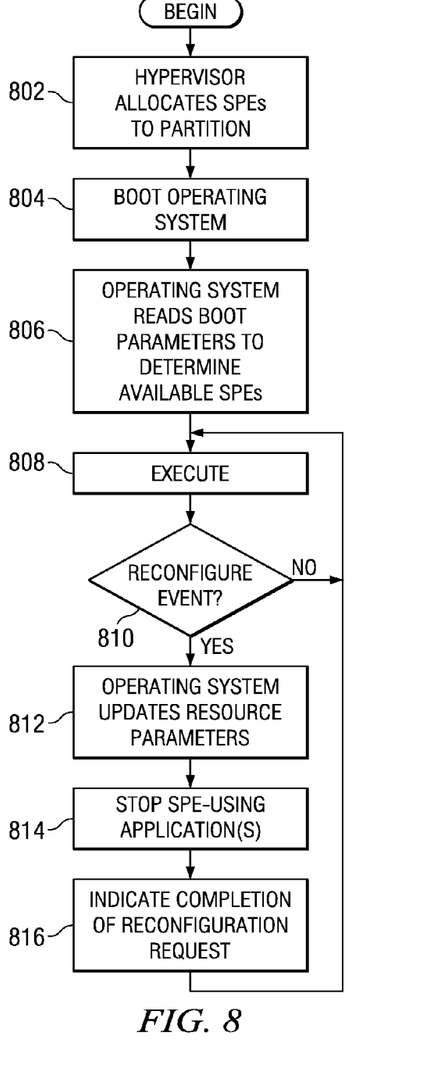
FIG. 8 is a flowchart illustrating static partitioning of synergistic processor elements with partition reconfiguration in accordance with an illustrative embodiment.

FIG. 8 is a flowchart of a process for static partitioning of synergistic processor elements with partition reconfiguration in accordance with an illustrative embodiment.

The hypervisor begins with the allocating of SPEs to the partition (step 802). The hypervisor then boots the operating system for the partition (step 804). The operating system reads the boot parameters to determine available SPEs (step 806) and the system executes (step 808).

Next, the hypervisor determines whether a reconfigure event occurs (step 810). A reconfigure event is an event that requires reallocation of resources or the use of resources. This reallocation may include reallocating processor resources. A user can dynamically change the size of partitions. The hypervisor, in conjunction with system management software performs the reconfiguration. A reconfigure event may be caused, for example, by a reconfiguration request or a monitoring program that determines reconfiguration is needed. This reconfiguration occurs with automatic system management also known as "autonomic computing".

If a reconfigure event does not occur, the process returns to step 808 where the system executes. If a reconfigure event occurs in step 810, the operating system updates the resource parameters (step 812) and optionally stops one or more SPE-using applications to reconcile the number of the SPEs used with the SPEs available in the partition (step 814). The operating system updates the resource parameters to include an identification of the resources now assigned to the partition. For example, the update may include an identification of a new SPE assigned to the partition. The operating system indicates completion of reconfiguration request via a handshake with the hypervisor (step 816). Thereafter, the process returns to step 808 where the system executes.

Figure 9:
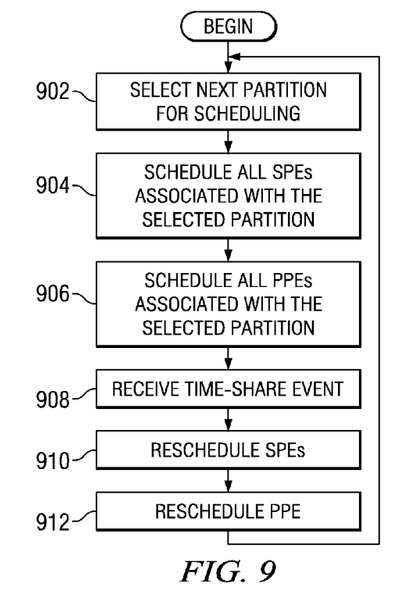
FIG. 9 is a flowchart illustrating operation of dynamic time-shared partitioning with gang scheduling in accordance with an illustrative embodiment.

FIG. 9 is a flowchart of a process for operation of dynamic time-shared partitioning with gang scheduling in accordance with an illustrative embodiment. In this example, the SPEs are virtualized by the hypervisor and made available across several partitions.

The process begins with the hypervisor selecting the next partition for scheduling (step 902). The hypervisor schedules all SPEs associated with the selected partition (step 904) and schedules all PPEs associated with the selected partition (step 906). In steps 904 and 906, the hypervisor decides which processors should be assigned to that partition, and configures it appropriately. This configuration, for example, includes configuring memory management information, updating LPID and other LPAR configuration registers to reflect the membership in a specific logical partition, load registers and other data that represents an architected state (such as the local store content in the case of the SPE), and initiating execution as part of the selected LPAR at the entry point associated with the specific virtual processor of that LPAR. When an SPE is scheduled, the SPE starts to execute the program associated with the virtual SPE of the partition to which it is assigned.

The hypervisor receives a time-share event (step 908), reschedules the SPEs (step 910), and reschedules the PPEs (step 912). The time-share event comes from a timer interrupt, or other interrupt associated with time keeping to share a physical processor between multiple virtual processors in these examples. A clock, implemented in chip or on system board, or otherwise integrated in system generates a time-share event in these examples. Thereafter, the process returns to step 902 to select the next partition for scheduling.

In one embodiment, the operating system identifies a request to reduce resource usage, triggered by a "pseudo-exception" or other such hypervisor-to-operating system request functionality, delivered to an operating system that is equipped to handle said hypervisor requests. This example may involve time-sharing of SPEs until the resource profile of applications is reduced and may include shutting down or freezing an application. This example may involve the operating system handshaking with the hypervisor to indicate an SPE is available to remove.

In one embodiment, time-share events are indicated by a hypervisor decremeter (HDEC). This component provides the hypervisor an ability to determine the end of a time share allocated to a specific partition. In accordance with such an implementation, the HDEC register is set to a value corresponding to a time quatum allocated to a partition, and a next partition is scheduled when an HDEC decrementer exception is received.

Figure 10:
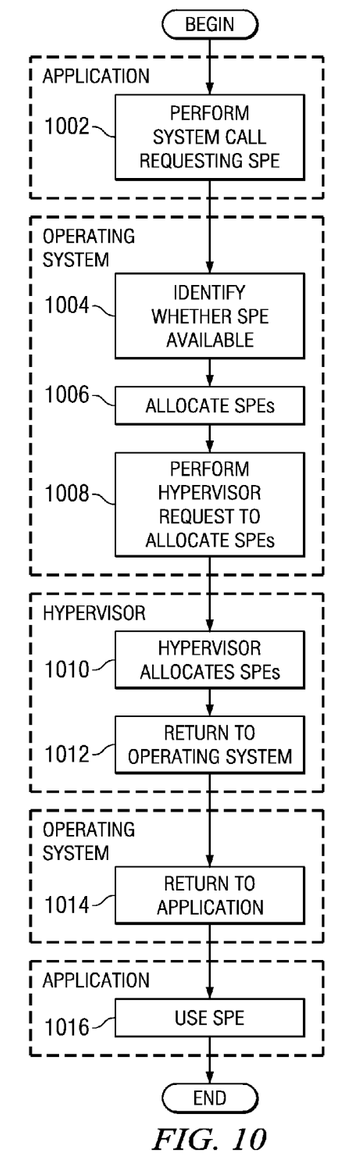
FIG. 10 is a flowchart illustrating space partitioning with processor allocation in accordance with an illustrative embodiment.

FIG. 10 is a flowchart of a process for space partitioning with processor allocation in accordance with an illustrative embodiment. In this example, the hypervisor does not permanently assign SPEs to partitions. Instead, the operating system dynamically allocates the SPEs by issuing requests to the hypervisor to change or reconfigure the allocation.

The process begins with the application performing a system call requesting a SPE (step 1002). The operating system identifies whether an SPE is available (step 1004). The operating system allocates available SPEs (step 1006) and performs a hypervisor request to allocate the SPEs (step 1008).

The hypervisor allocates the SPEs (step 1010 and returns to the operating system (step 1012). Control to continue execution in step 1012. The operating system then returns to the application (step 1014). Thereafter, the application uses the SPE (step 1016), and process terminates. In step 1016, the application may send the SPE instructions to perform a calculation or other processing of data.

In the context of this application, an SPE is assigned to a computer program by configuring the associated memory flow controller within the SPE to indicate the assignment. As such, an SPU execution resource is assigned by assigning the SPE. In many instances, the terms "SPU" and "SPE" are used interchangeably.

Figure 11:
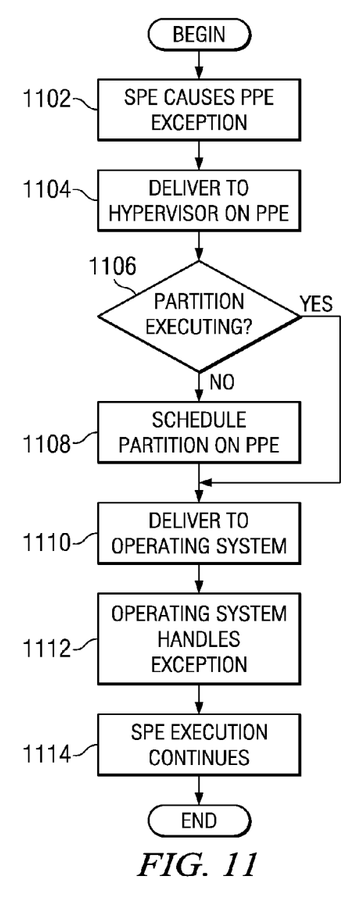
FIG. 11 is a flowchart illustrating operation of on-demand hypervisor management of processor resources in accordance with an illustrative embodiment.

FIG. 11 is a flowchart of a process illustrating operation of on-demand hypervisor management of processor resources in accordance with an illustrative embodiment. The process beings with an SPE causing a PPE exception (step 1102). The SPE delivers the exception to the hypervisor on the PPE (step 1104). In one embodiment, SPE-originated exceptions are delivered to a PPE using an internal interrupt controller equipped to process external exception and interrupt events directed at a processor. When a page fault or other exception condition is detected, the condition is handled on the PPE. To accomplish this, the Cell BE Internal Interrupt Controller (IIC) delivers SPE exceptions. The depicted implementation has two IIC's for each PPE, corresponding to one per PPE thread. The IIC then delivers the exception to the PPE, where it is handled under the control of the Logical Partitioning Environment Selector (LPES).

In accordance with a first LPES setting, wherein the LPES is configured to a value of 0b01, the PPE delivers the interrupt to the hypervisor by putting the PPE into hypervisor mode and raising an exception. As a result, the interrupt goes directly to the hypervisor and the hypervisor interrogates the IIC.

In accordance with a second LPES setting, wherein the LPES is configured to a value of 0b11, the PPE delivers the interrupt to the operating system running in the current partition by putting the PPE into privileged operating system mode and raising an exception. The hypervisor expects the partition to perform an hcall query (H_XIRR) which causes the hypervisor to interrogate the IIC.

From that common point, the/any hypervisor then "routes" the interrupt to the appropriate partition by reflecting the interrupt to the partition's 0x500 vectored exception facility.

The second model requires cooperative operation between operating systems, by delivering exceptions not destined to the current partition to a hypervisor. In other configurations in accordance with an illustrative embodiment, an implementation can support determining whether an exception source and target have the same LPID identifier. Not all exceptions have associated partition identifiers, as some resources may be shared between multiple partitions. If the LPID identifiers match, the exception is delivered to the operating system. Otherwise, the exception is delivered to the hypervisor. When multiple PPEs are present, an implementation can select the target PPE based on partition membership information to increase the likelihood of delivering events to associated partitions.

Of course, other configurations are also possible in the scope of the embodiments, such as providing only a single exception delivery model without providing LPES-based configuration. Other determination steps and methods can also be practiced within the scope of the illustrative embodiments.

In some processor architectures, interrupts refer to internal events, while exceptions refer to external events. In these examples, both types of events are referenced, unless otherwise indicated by the context. Hence, in the context of the teachings contained herein, "interrupt" and "exception" are used interchangeably.

The hypervisor determines whether the partition associated with the exception-causing SPE is executing on the PPE (step 1106). In step 1106, the hypervisor is scheduled on the PPE. When a virtual SPE wants to deliver an exception to a virtual PPE, this determination determines whether the physical PPE represents an appropriate virtual PPE. This determination is made because the PPE could be bound to another partition, and there may not be a PPE currently scheduled for this partition. In one embodiment, this check is performed by comparing a logical partition identifier (LPID) associated with the SPE raising the exception with the logical partition identifier of at least one PPE.

If the corresponding partition is not executing, the hypervisor schedules the partition on the PPE (step 1108) and delivers the exception to the operating system (step 1110). If a partition is executing on the PPE in step 1106, the process proceeds directly to step 1110 to deliver to the operating system. In one embodiment, the exception is delivered using a mediated external interrupt mechanism in accordance with the Power Architecture™ specification.

Next, the operating system handles the exception (step 1112), and the operating system, or an application executing on the operating system handles the SPE exception. If SPE execution or memory flow controller (MFC) operation has been stopped in the SPE, execution is optionally restarted. The SPE execution then continues (step 1114). Thereafter, the process terminates.

Figure 12A:
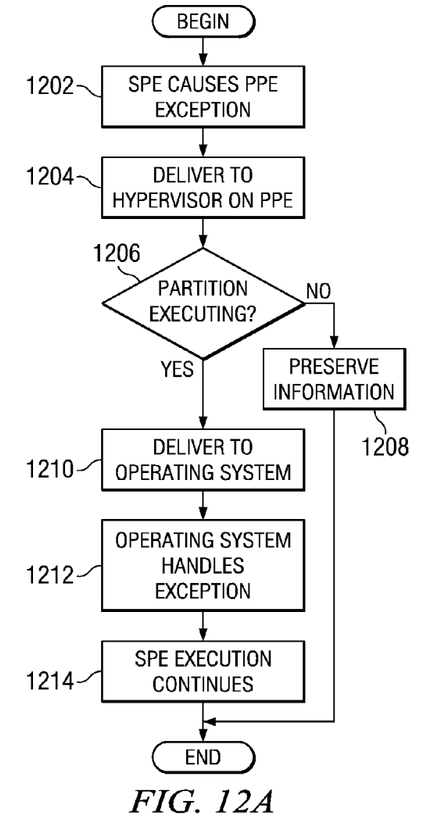
FIGS. 12A and 12B show alternate embodiments of handling processor-generated events when no principal processor is associated with the partition generating the event in accordance with an illustrative embodiment.
Figure 12B:
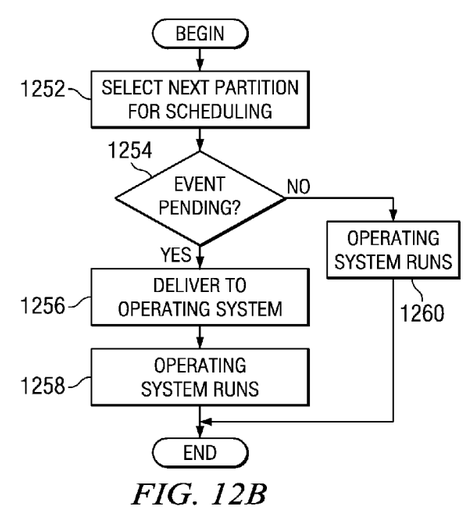

Referring now to FIGS. 12A and 12B, in an alternative embodiment, if the partition associated with the SPE exception is not executing on a Cell BE chip, the hypervisor preserves exception information until the target partition of the SPE exception is scheduled on the Cell BE chip. An example of a partition not executing in the core is when an LPID of the exception-generating SPE does not match the LPID of the PPE. In accordance with this decision, the cost of context switching is reduced, by reducing the number of context switch events, at the cost of delaying response time to exceptions.

FIGS. 12A and 12B show alternate embodiments of handling processor-generated events when no principal processor is associated with the partition generating the event. More particularly, with reference to FIG. 12A, the process begins with the SPE causes a PPE exception (step 1202). The SPE delivers the hypervisor to the PPE (step 1204).

The hypervisor determines whether the partition corresponding to the partition of the exception-causing SPU is executing on the Cell BE chip (step 1206). If the partition is not executing on the core, the hypervisor preserves exception information until the partition is dispatched (step 1208), and the process terminates. If the partition is executing the Cell BE chip in step 1206, the hypervisor delivers the exception to the operating system (step 1210). Next, the operating system handles the exception (step 1212), and the SPE execution continues (step 1214) with the process terminating thereafter.

Turning to FIG. 12B, the process begins with the hypervisor selecting the next partition for scheduling (step 1252). The hypervisor determines whether an event is pending (step 1254). If an event is pending, the hypervisor delivers the exception to the operating system (step 1256), and the operating system runs (step 1258). In step 1258, the operating system continues to run and processes the exception. Thereafter, the process terminates. If an event is not pending in step 1254, the operating system runs (step 1260), and the process terminates.

In another embodiment, a dynamic determination is made whether to deliver the exception immediately, or in a delayed manner. According to such embodiments, real-time partitions are preferably not interrupted to schedule an alternate partition to deliver an exception. In another aspect of dynamic decisions, exceptions requiring real-time response cause their target partition to be scheduled on at least one Power Architecture™ core and are delivered immediately. Those skilled in the art will understand the use of other dynamic criteria.

Although the depicted examples use a hypervisor to provide features for the different embodiments, this particular type of partition management software was chose merely to illustrate one possible implementation. These depicted features may be implemented in any type of partition management software.

Although the depicted examples have been explained in the context of a Cell BE chip, other embodiments can be implemented using other heterogeneous architectures, wherein other cores are taking the place of a first PPE and a second SPE.

Thus, the illustrative embodiment provides a mechanism for logical partitioning and virtualization in a heterogeneous architecture. The embodiments provide a consistent view of the system with dynamic management capabilities. The illustrative embodiments offer an integrated system view that encompasses all processing elements in a system. A hypervisor may partition a heterogeneous processor system into multiple subsystems, each of which having optionally multiple processor element types within the respective partitions.

The exemplary embodiments can take the form of an entirely hardware embodiment, an entirely software embodiment or an embodiment containing both hardware and software elements. The exemplary embodiments may be implemented in software, which includes but is not limited to firmware, resident software, microcode, etc.

Furthermore, the exemplary embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the exemplary embodiments has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method for allocating processor cores in a heterogeneous multi-core processor, the method comprising:

creating a first virtual processor of a first type by allocating, by partition management software, a first portion of a first physical processor of the first type included in a first set of processors of the first type to a first partition in the heterogeneous multi-core processor;

creating a second virtual processor of the first type by allocating, by the partition management software, a second portion of the first physical processor of the first type to a second partition in the heterogeneous multi-core processor;

creating a first virtual processor of a second type by allocating, by the partition management software, a first portion of a first physical processor of the second type of a second set of processors of the second type to the first partition;

creating a second virtual processor of the second type by allocating, by the partition management software, a second portion of the first physical processor of the second type to the second partition;

causing, by the first virtual processor of the second type, a first processor of the first type exception that is intended to be delivered to the first virtual processor of the first type, wherein the first processor of the first type exception is delivered to the first physical processor of the first type;

in response to the first processor of the first type exception, determining a logical partitioning environment selector setting;

in response to the logical partitioning environment selector setting being a first value:
 putting the first physical processor of the first type into partition management software mode and raising a first particular exception; and
 interrogating, by the partition management software, an internal interrupt controller in the heterogeneous multi-core processor;

in response to the logical partitioning environment selector setting being a second value:
 putting the first physical processor of the first type into privileged operating system mode and raising a second particular exception;
 performing, by a particular partition to which the first physical processor of the first type is currently allocated, a query; and
 interrogating, by the partition management software, the internal interrupt controller;

determining, by the partition management software, if the first physical processor of the first type is currently allocated to the first partition that is associated with the first virtual processor of the second type by comparing a logical partition identifier associated with the first virtual processor of the second type with a logical partition identifier associated with the particular partition to which the first physical processor of the first type is currently allocated; and in response to the first physical processor of the first type being currently allocated to the second partition, scheduling the first partition on the first physical processor of the first type and delivering the exception to an operating system that is being executed by the first partition.

2. The method of claim 1, wherein the partition management software is a hypervisor.

3. The method of claim 1, further comprising:
booting a second operating system in a third partition.

4. The method of claim 3, further comprising:
reading boot parameters to determine a number of processors of the first type available in the second set of processors of the second type.

5. The method of claim 3, further comprising:
allocating a first group of the first set of processors of the first type to the third partition;
allocating a first group of the second set of processors of the second type to the third partition; and
responsive to a reconfiguration event:
 allocating a second group of the first set of processors of the first type to the third partition, wherein the first group of the first set of processors of the first type is no longer allocated to the third partition; and
 allocating a second group of the second set of processors of the second type to the third partition, wherein the first group of the second set of processors of the second type is no longer allocated to the third partition.

6. The method of claim 3, further comprising:
responsive to a request to allocate a processor of the second type from the second operating system, allocating an additional processor of the second type to the third partition.

7. The method of claim 1, wherein the heterogeneous architecture is implemented using a Cell Broadband Engine chip, wherein the first set of processors of the first type is a set of Power Processor Elements, and wherein the second set of processors of the second type is a set of Synergistic Processor Elements.

8. The method of claim 1, wherein the first partition is one of an application partition and a gaming partition.

9. The method of claim 8, wherein the second partition is one of a network partition, a security partition, and a media recording partition.

10. A data processing system, comprising:
a multi-core, heterogeneous processor comprising:
a first set of processors of a first type;
a second set of processors of the second type
wherein a first virtual processor of a first type is created by allocating, by partition management software, a first portion of a first physical processor of the first type included in the first set of processors of a first type to a first partition in the heterogeneous multi-core processor;
wherein a second virtual processor of the first type is created by allocating, by the partition management software, a second portion of the first physical processor of the first type to a second partition in the heterogeneous multi-core processor;
wherein a first virtual processor of a second type is created by allocating, by the partition management software, a first portion of a first physical processor of the second type of the second set of processors of the second type to the first partition;
wherein a second virtual processor of the second type is created by allocating, by the partition management software, a second portion of the first physical processor of the second type to the second partition;
wherein the first virtual processor of the second type causes a first processor of the first type exception that is intended to be delivered to the first virtual processor of the first type, wherein the first processor of the first type exception is delivered to the first physical processor of the first type;
in response to the first processor of the first type exception, wherein determining a logical partitioning environment selector setting;
wherein in response to the logical partitioning environment selector setting being a first value:
 the first physical processor of the first type is put into partition management software mode and raising a first particular exception; and
 the partition management software interrogates an internal interrupt controller in the heterogeneous multi-core processor;
wherein in response to the logical partitioning environment selector setting being a second value:
 the first physical processor of the first type is put into privileged operating system mode and raising a second particular exception;
 a particular partition to which the first physical processor of the first type is currently allocated performs a query; and
 the partition management software interrogates the internal interrupt controller;

wherein the partition management software determines if the first physical processor of the first type is currently allocated to the first partition that is associated with the first virtual processor of the second type by comparing a logical partition identifier associated with the first virtual processor of the second type with a logical partition identifier associated with the particular partition to which the first physical processor of the first type is currently allocated; and wherein in response to the first physical processor of the first type being currently allocated to the second partition, scheduling the first partition on the first physical processor of the first type and delivering the exception to an operating system that is being executed by the first partition.

11. The data processing system of claim 10, wherein the partition management firmware is a hypervisor.

12. The data processing system of claim 10, wherein the hypervisor boots a third operating system in a third partition.

13. The data processing system of claim 12, wherein the third operating system reads boot parameters to determine a number of processors of the second type available in the second set of processors of the second type.

14. The data processing system of claim 12, further comprising:
  a first group of the first set of processors of the first type allocated to the third partition;
  a first group of the second set of processors of the second type allocated to the third partition; and
  wherein the hypervisor, responsive to a reconfiguration event:
    allocates a second group of the first set of processors of the first type to the third partition, wherein the first group of the first set of processors of the first type is no longer allocated to the third partition; and
    allocates a second group of the second set of processors of the second type to the third partition, wherein the first group of the second set of processors of the second type is no longer allocated to the third partition.

15. The data processing system of claim 12, wherein the hypervisor, responsive to a request to allocate a processor of the second type from the second operating system, allocates an additional processor of the second type to the third partition.

16. The data processing system of claim 10, wherein the heterogeneous architecture is a Cell architecture, wherein the first set of processors of the first type is a set of Power Processor Elements, and wherein the second set of processors of the second type is a set of Synergistic Processor Elements.

17. The data processing system of claim 16, wherein the hypervisor executes on the first physical processor of the first type.

18. The data processing system of claim 10, wherein the first partition is one of an application partition and a gaming partition.

19. The data processing system of claim 18, wherein the second partition is one of a network partition, a security partition, and a media recording partition.

20. A computer program product for allocating processor cores in a heterogeneous multi-core processor having memory storing computer usable program code when executed by a processor to perform the steps of:
  create creating a first virtual processor of a first type by allocating, by partition management software, a first portion of a first physical processor of the first type included in a first set of processors of a first type to a first partition in the heterogeneous multi-core processor;
  creating a second virtual processor of the first type by allocating, by the partition management software, a second portion of the first physical processor of the first type to a second partition in the heterogeneous multi-core processor;
  creating a first virtual processor of a second type by allocating, by the partition management software, a first portion of a first physical processor of the second type of a second set of processors of the second type to the first partition;
  creating a second virtual processor of the second type by allocating, by the partition management software, a second portion of the first physical processor of the second type to the second partition:
  causing, by the first virtual processor of the second type, a first processor of the first type exception that is intended to be delivered to the first virtual processor of the first type, wherein the first processor of the first type exception is delivered to the first physical processor of the first type;
  in response to the first processor of the first type exception, determining a logical partitioning environment selector setting;
  in response to the logical partitioning environment selector setting being a first value:
    putting the first physical processor of the first type into partition management software mode and raising a first particular exception; and
    interrogating, by the partition management software, an internal interrupt controller in the heterogeneous multi-core processor;
  in response to the logical partitioning environment selector setting being a second value:
    putting the first physical processor of the first type into privileged operating system mode and raising a second particular exception;
    performing, by a particular partition to which the first physical processor of the first type is currently allocated, a query; and
    interrogating, by the partition management software, the internal interrupt controller;
  determining, by the partition management software, if the first physical processor of the first type is currently allocated to the first partition that is associated with the first virtual processor of the second type by comparing a logical partition identifier associated with the first virtual processor of the second type with a logical partition identifier associated with the particular partition to which the first physical processor of the first type is currently allocated: and
  in response to the first physical processor of the first type being currently allocated to the second partition, scheduling the first partition on the first physical processor of the first type and delivering the exception to an operating system that is being executed by the first partition.

21. The computer program product of claim 20, wherein the partition management software is a hypervisor.

22. The computer program product of claim 20, further comprising:
  booting a second operating system in a third partition.

23. The computer program product of claim 22, further comprising:
  reading boot parameters to determine a number of second processors of the second type available in the second set of second processors of the second type.

24. The computer program product of claim 22, further comprising:

allocating a first group of the first set of processors of the first type to the third partition;

allocating a first group of the second set of processors of the second type to the third partition; and responsive to a reconfiguration event:

allocating a second group of the first set of first processors of the first type to the third partition, wherein the first group of the first set of processors of the first type is no longer allocated to the third partition; and allocating a second group of the second set of processors of the second type to the third partition, wherein the first group of the second set of processors of the second type is no longer allocated to the third partition.

25. The computer program product of claim 22, further comprising:

responsive to a request to allocate a processor of the second type processor core of the second type from the second operating system, allocating an additional processor of the second type processor core of the second type to the partition.

26. The computer program product of claim 20, wherein the heterogeneous architecture is a Cell architecture, wherein the first set of processors of the first type is a set of Power Processor Elements, and wherein the second set of processors of the second type is a set of Synergistic Processor Elements.

* * * * *